United States Patent [19]

Castelaz

[11] Patent Number: 5,001,631

[45] Date of Patent: Mar. 19, 1991

[54] CELLULAR NETWORK ASSIGNMENT PROCESSOR USING RANDOMLY TRIGGERED ADAPTIVE CELL THRESHOLDS

[75] Inventor: Patrick F. Castelaz, Yorba Linda, Calif.

[73] Assignee: Hughes Aircraft Company, Los Angeles, Calif.

[21] Appl. No.: 255,190

[22] Filed: Oct. 7, 1988

[51] Int. Cl.$^5$ .............................................. G06F 15/20
[52] U.S. Cl. .................................... 364/402; 364/513; 364/517
[58] Field of Search ................. 364/402, 513, 516, 517

[56] References Cited

U.S. PATENT DOCUMENTS

| | | | |
|---|---|---|---|
| 3,443,078 | 5/1969 | Noronha et al. | 364/402 X |
| 3,562,502 | 2/1971 | Kautz | 364/513 |
| 3,950,733 | 4/1976 | Cooper et al. | 364/900 |
| 4,025,919 | 5/1977 | Jefferies et al. | 364/516 X |
| 4,254,474 | 3/1981 | Cooper et al. | 364/900 |
| 4,326,259 | 4/1982 | Cooper et al. | 364/715.11 |
| 4,450,530 | 5/1984 | Llinas et al. | 364/513 |
| 4,591,980 | 5/1986 | Huberman et al. | 364/200 |
| 4,802,103 | 1/1989 | Faggin et al. | 364/513 |
| 4,858,147 | 8/1989 | Conwell | 364/513 |
| 4,914,604 | 4/1990 | Castelaz | 364/517 |

OTHER PUBLICATIONS

Lippman, Richard P.-"An Introduction to Computing with Neural Nets" IEEE ASSP MAG. 4/87.

*Primary Examiner*—Jerry Smith
*Assistant Examiner*—David Huntley
*Attorney, Agent, or Firm*—Wanda K. Denson-Low

[57] ABSTRACT

An information processor (10) for solving assignment problems uses a matrix of individual processing cells. The location of each cell within the processor (10) corresponds to the position of the costs in the associated constraint space of the assignment problem, and each cell contains a cost register (12) that is stored with an associated cost value. A noise generator (14) associated with each cell is used to trigger a variable threshold (16) in each cell so that cost values may be transmitted by each cell only when the signal from the noise generator (14) exceeds the threshold. When triggered, the cell disables all other cells along each dimensional axes stemming from the cell from contributing to the current tentative solution. This disabling is removed at the beginning of the next cycle. Successive solutions to the assignment problem are evaluated by adding the cost values in an accumulator (30) for cells that represent each particular solution. The sums are then compared to a criteria by a comparator (34). Thresholds are then lowered by a threshold adjustment circuit (26) for good solutions and raised for bad solutions. This leads the activity of the processor (10) toward a final stable state which corresponds to a near optimal solution of the assignment problem.

28 Claims, 1 Drawing Sheet

CELLULAR NETWORK ASSIGNMENT PROCESSOR USING RANDOMLY TRIGGERED ADAPTIVE CELL THRESHOLDS

BACKGROUND OF THE INVENTION

1. Technical Field

This invention relates to information processors, and more particularly, to an information processor having a number of interconnected processing cells with randomly triggered adaptive cell thresholds.

2. Discussion

Of the many problems that information processors are used to solve, optimization problems of the general class of constrained assignment problems are among the most difficult. This is because constrained assignment problems often are not solvable with a single solution but there may be a range of solutions of which the "best" solution is sought. In general, assignment problems involve choosing a particular solution where there are more choices than there are possible solutions. Often one entity is to be selected from among many and assigned to one and only one other entity in such a way to force the entire assignment over all entities to be optimal in some sense. Where individual "costs" are assigned to each entity-to-entity mapping the problem becomes one of minimizing the total cost. Examples of assignment problems include optimal plot-to-track correlation processing, the traveling salesman problem, optimal weapons allocation, deghosting for angle-only (passive) targets detected by three or more sensors, computerized tomography, multi-beam acoustic and ultrasound tracking, nuclear particle tracking, etc.

Previous approaches to assignment problems have emphasized solutions in software on general purpose computers. One disadvantage with software solutions to assignment problems is that they require massive computational power and are exceedingly slow for application to real-time or near-real-time problems such as angle-only target location problems. This is because, these problems frequently involve a "combinatorial explosion", an exponential blowup in the number of possible answers. Thus, to solve the deghosting problem, conventional solutions, even using advanced state of the art array and parallel processors, have difficulty handling real-time problems of realistic sizes. For example, conventional solutions of the deghosting problem are sufficiently fast up to about 15 targets, but become exponentially computation-bound beyond that. For numbers of targets in the range of 30 or so, typical software approaches using integer programming techniques could require virtually years of VAX CPU time.

Others have suggested approaches for solving assignment problems utilizing neural networks. Such systems are called neural networks because of their similarity to biological networks in their structure and in their ability to exhibit self-learning. For example, see U.S. Pat. No. 4,660,166, issued to J. Hopfield, where a type of neural network is used to solve the Traveling Salesman Problem. Others have suggested the use of a neural network technique known as simulated annealing. See S. Kirkpatrick, Gelatt, and Vecchi: "Optimization by Simulated Annealing", 220 Science, p. 671-680 (1983). However, while algorithms using this approach have been developed, to the applicant's knowledge, actual working architectures have not been implemented. Also, neural nets such as the one described in U.S. Pat. No. 4,660,166 are generally not fast enough for real-time applications of reasonable complexity. Recent results suggest severe limitations to the size of problems addressable by Hopfield nets. For example, the traveling salesman problem fails for more than thirty cities.

Thus it would be desirable to provide an information processor that reduces the computation time required to solve constrained assignment problems of realistic sizes in real-time.

SUMMARY OF THE INVENTION

Pursuant to the present invention, an information processor is provided which can rapidly solve assignment problems, having a relatively simple architecture. The processor utilizes a matrix of simple processing elements, or cells, that are connected together in a regular structure. The cells accept as input, data which represents information, or "costs" in an assignment problem in two or greater dimensions. The interconnection structure between the cells is fixed to represent the position of the costs in the asociated constraint spaceof the assignment problem. A means for generating a randomly varying signal, such as a random number generator is provided for each cell. A variable threshold means is associated with each cell and is triggered by the random number generator. As a result, the cost can only be transmitted by the cell when the random signal exceeds the threshold. An accumulator, or summer, external to the cells is provided to add up all of the costs which represent a given tentative solution to the problem. This sum is then compared by a comparator to determine the goodness (nearness to the best solution) of the current solution. This may involve comparison with an absolute criteria, or other criteria, such as running history of solutions to date for the particular problem being processed.

Once the above comparison is made, an adjustment is made in the variable thresholds. In particular, if the sum of the cost for the current solution is classified as good, the thresholds for those cells are lowered, otherwise the thresholds are raised. In this way, the probability of getting an output from cells contributing to a good solution is increased. The resulting collective processing leads the activity of the processor toward a final stable state which corresponds to a near optimal solution of the assignment problem represented by the costs.

BRIEF DESCRIPTION OF THE DRAWINGS

The various advantages of the present invention will become apparent to one skilled in the art by reading the following specification and by reference to the following drawings in which.

DESCRIPTION OF THE PREFERRED EMBODIMENT

Figure 1:
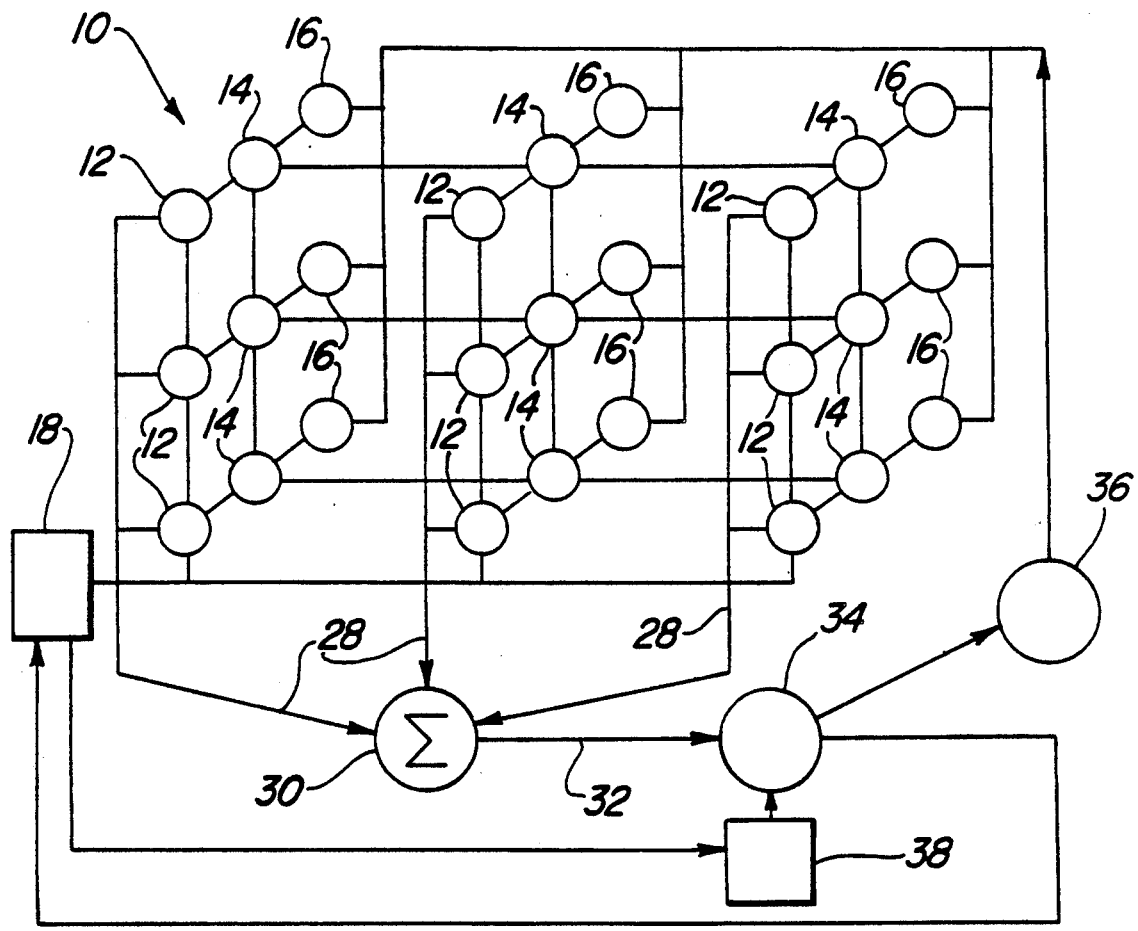
FIG. 1 is a diagram of the architecture of the cellular network assignment processor in accordance with the teachings of the present invention.

Referring to FIG. 1, a diagram of the architecture of the cellular network assignment processor using randomly triggered adaptive cell thresholds in accordance with the present invention is shown. In the preferred embodiment the cellular network assignment processor 10 is adapted to solve constrained assignment problems such as deghosting for angle-only information from three sensors. The cellular network assignment processor 10 contains an array of processing cells which comprise cost registers 12, noise generator 14, and adaptive thresholds 16. The cost registers 12 receive and store information from a host CPU 18. The host CPU 18 can access each cost register 12 individually. This information corresponds to costs in an assignment problem of two or greater dimensions. For example, in deghosting angle-only information from thre sensors, there will be a three dimensional cube of cells. Rows of cells on a first, or x, axis in a first plane in the cube will correspond to all possible sensor angles for a first sensor. Locations on the y axis, perpendicular to the x axis, corresponds to all the possible sensor angles for a second sensor. Likewise, locations on the z axis, perpendicular to both the x and y axis represent all possible sensor angles for a third sensor. For simplicity, FIG. 1 shows the cells in two dimensions only.

Figure 2:
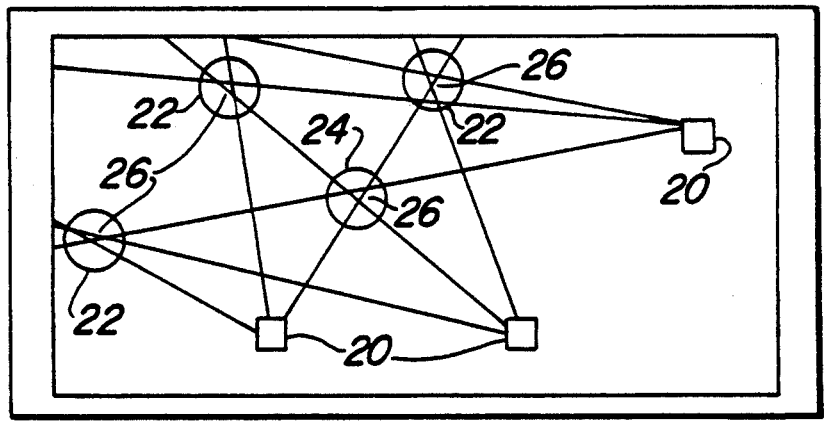
FIG. 2 is a diagram of a typical deghosting problem with angle-only data from three sensors.

Referring now to FIG. 2, the information to be stored in the cost registers 12, represents triple intersects of the three sensors. That is, when a sensor 20 detects a target 22, a line is plotted from the sensor location to the target. Every point where the lines from the three sensors all intersect is called a triple intersect. Note, however, that some of these intersects represent real targets 22, and are thus valid, while some are "accidental" triple intersects and are invalid, or "ghosts" 24. The assignment problem then is to eliminate the ghosts, or deghost the data, so that only actual targets are detected.

As will be appreciated, a host CPU 18 such as the one in FIG. 1 can detect the triple intersects and transmit the angular data from each sensor that corresponds to each triple intersect. In addition, the host CPU 18 will also calculate the area of the triangles 26 found at each triple intersect. This triangle 26 is formed because of measurement errors in the sensor data. Even for valid targets, the triple intersect will not be a point but will instead by a small triangular area formed by the three lines. The host CPU 18 will call a triple intersect those intersects having a triangle with an area below a given criteria. The host CPU 18 will then transmit digital data representing this area for each triple intersect to the cost register 12 associated with those three angles for the three sensors. It is the area of this error triangle that is the "cost" in the assignment problem. The processor 10 minimizes total cost by minimizing the area of the summed triangles. Since triangles corresponding to ghost will tend to be larger than those corresponding to real targets, the processor 10 eliminates ghosts by choosing solution having smaller triangles. The assumption that real targets will have smaller triangles than ghost is generally valid for problems having up to about 50 targets. As the density increases, with greater number of targets, the number of ghosts become extremely large. For example, there may be tens of thousand of ghosts. At this point, the probability is increased that some ghosts may have smaller triangles than targets and performance could begin to degrade.

In sum, the host CPU 18 receives the angular data from the sensors, determines where triple intersects occur and sends the area of the error triangle of the triple intersect to the cost register 12 associated with that set of angles from the three targets. The cost registers 12 then, by their location in the processor 10, represent a mapping of a set of three angles, and each cost register 12 stores the area of the error triangle for that particular triple intersect.

Each cost register 12 has associated with it a noise generator 14 and an adaptive threshold 16. The noise generator 14 may comprise a number of conventional means for generating a randomly varying signal. While the processor 10 is operating, all of the noise generators 14 are free running simultaneously. Each noise generator 14 is coupled to an associated adaptive threshold 16, which is also coupled to the cost register 12. The adaptive threshold 16 acts as a gate in combination with the noise generator 14 to permit the cost register 12 to transmit the cost value it contains only under certain circumstances. In particular, when the instantaneous magnitude of the signal generated by the noise generator 14 exceeds the threshold value in the adaptive threshold 16, the cost in the cost register 12 may be fed into a data line 28. Likewise, when the magnitude of the signal generated by the noise generator 14 is lower than the threshold value in the adaptive threshold 16, the cost value in the cost register 12 cannot be fed into the data line 28.

Once the cost registers 12 are stored with all of the costs corresponding to triple intersects, the task of the processor 10 is to select those cost registers 12 that represent real targets and eliminate those representing the ghosts. In the preferred embodiment, based on the information processed by the host 18, the processor 10 does not know which intersects represent real targets and which are ghosts. However, the processor 10 does know how many real targets there are. To determine real targets from ghosts, the processor 10 makes a series of tentative selections of proposed solutions having the correct number of choices and then decides whether this solution is a good or a bad solution. This decision is made by adding up all of the costs for a given solution. The lower the total cost, the better the solution. The thresholds 16 associated with costs for good solutions are then lowered, while the thresholds 16 associated with costs contributing to bad solutions are raised. After a number of such cycles, the processor 10 eventually moves in the direction of a valid optimal solution to the problem. It should be noted that the inverse of the area of the error triangles could be used for cost values. In such a case the processor would be instructed to maximize rathe than minimize total cost.

To begin solving a problem, the adaptive thresholds 16 are set to some initial value. These values may be identical or may vary among cells and the values chosen for the initial thresholds will depend on such factors as, for example, the corresponding individual cost values. Initial thresholds may be set proportional to costs. After an initial period, each noise generator 14 generates a value which may or may not exceed the present threshold value. For those thresholds 16 which are exceeded, the cost value in the associated costs register 12 will be transmitted along the data line 28 to an accumulator 30. In addition, the associated location address of the cell corresponding to the three angles for the three sensors will also be transmitted along with the data in that cost register 12. Further, all cells in the same row and column (for a 2-D processor, along all three axes for 3-D (deghosting) processor) are instantly and simultaneously "disabled" from contributing to the current tentative solution, for example, their noise generators are "shut off". This insures only one contribution from each row and column to satisfy the fundamental assignment problem constraint of assigning M and only M things to N things. For those cost registers 12 where the noise generator 14 does not exceed the threshold, no cost value will be transmitted. The cost values reaching the accumulator 30 will be counted by the accumulator until the number of cost values equals the number of targets. Then the accumulator 30 will add up the costs to arrive at a total cost for the solution.

The accumulator 30 also contains a means for storing the address of each cost register 12 from which it receives a cost value. It will be appreciated that the summing may be accomplished by the accumulator 30 by conventional circuits capable of producing an output that is the sum of the values it receives as input. The sum is then sent along a data line 32 to a comparator circuit 34. The comparator 34 compares the sum to a particular number, or criterion, to determine if the solution is a "good" or a "bad" solution. This criterion may be an absolute preselected criterion or it may simply be a running history of the best solutions-to-date for the particular problem being processed. In the latter case, the comparator 34 will also have a means for storing the sum from previous solutions and a means for comparing the current solution to the previous solution, and for storing the better or the two. It should be noted that the first tentative solution will be a result of the "randomly" selected cost registers 12 and since there is no history of solutions an absolute criteria must be used for this first solution. Consequently, the first solution is stored as "best" by default. Later solutions can then be compared to a running history.

It the solution is classified as good, the comparator 34 will transmit the associated location address of the costs contributing to the solution to a threshold adjustment circuit 36. The threshold adjustment circuit 36 will then transmit a signal to the adaptive thresholds 16 associated with those addresses contributing to the current solution. This signal will cause the adaptive thresholds 16 to lower for those cost register 12 contributing to good solutions. In this way, the probability of having those cost registers 12 contribute to future solutions is increased. Optionally, the adjustment circuit 36 may also raise the thresholds for all other cost registers 12. Since raising the thresholds for some cost registers 12 is relatively equivalent to lowering the thresholds of the others, the step of lowering the thresholds for noncontributing cost registers 12 is not an absolute necessity.

In other cases, the comparator 34 will determine that the current solution is bad. That is, the summation of the cost values for the current solution is less than the selected criterion. In such cases, the threshold adjustment circuit 36 will raise the thresholds in the adaptive thresholds 16 associated with the cost registers 12 contributing to that bad solution. In this way, the probability is decreased that those cost registers 12 contributing to the bad solution, will contribute to future solutions.

As mentioned above, the comparator circuit 34 also stores the address of the cost registers 12 which contribute to the best solution-to-date. An interrupt circuit 38 may be employed to stop the processor 10 at any time to retrieve the best solution-to-date stored in the comparator circuit 34. The interrupt circuit 38 is connected to the host computer 18 and also to the comparator 34. In this way, the best solution-to-date can be retrived at any time. This is often a requirement for real-time systems where the time the processor is given to arrive at a solution may vary. In cases where the interrupt is not used, a limit on the number of processing cycles may be set. This limit may be achieved by employing a counter in the comparator circuit 34 which counts the number of solutions or cycles produced and causes the processor 10 to stop and transmit the best solution-to-date after the predetermined number of cycles has been exceeded.

The complexity of the problem to be solved will determine the number of cycles to achieve an optimal solution. It has been found that the processor 10 after a given number of cycles for a particular problem will reach a stable state and settled into a particular solution so that additional cycles will not achieve a better solution.

It should be noted that beyond solving the deghosting problem for angle only data from three sensors, the present invention may be adapted to solve other assignment problems such as the Traveling Salesman Problem, optimal plot-to-track correlation processing, optimal weapons allocation, computerized tonography and others. It will be appreciated that the basic components of the processor 10 may be implemented with conventional electrical circuits including programmable logic devices. Also, optical devices may be used for some of the functions.

From the foregoing description it can be appreciated that the present invention provides a processor 10 capable of solving assignment problems in real-time, at speeds of 3-4 orders-of-magnetide faster than conventional solutions. Those skilled in the art can appreciate that other advantages can be obtained from the use of this invention and that modifications can be made without departing from the true spirit of the invention after studying the specifications, drawings and following claims.

What is claimed is:

1. In an information processor for solving assignment problems, said information procesor having a multidimensional matrix of processing cells, each capable of receiving, storing and transmitting cost values, the improvement comprising;

said cells being located in a position that represents a particular set of input parameters;

means for generating a randomly varying signal associated with each cell;

variable threshold means for generating threshold levels and for permitting said cost value to be transmitted by said cells only when said threshold level is exceeded by said randomly varying signal;

accumulator means for summing said cost values in a plurality of said cells, after said cost value has been transmitted by said cells;

comparator means, responsive to said accumulator means, for comparing the sum of said cost values with a predetermined value to classify said sum as being a good or a bad solution; and means for adjusting said thresholds, responsive to said comparator means, wherein said thresholds are lowered for those cells which contribute to solutions classified as good and thresholds are raised for cells which contribute to solutions clasified as bad.

2. The information processor of claim 1 further comprising means for determing when the number of cost values transmitted exceeds a predetermined number, wherein said accumulator means sums said predetermined number of said cost values.

3. The information processor of claim 1 wherein said means for generating a randomly varying signal is located within each cell.

4. The informatiaon processor of claim 2 wherein said assignment problem comprises deghosting from angle-only sensor data; said particular input parameters are particular angles for particular sensors; said predetermined number is the number of targets; and said cost values are proportional to the error associated with intersects from said sensors.

5. The information processor of claim 1 wherein said variable threshold means is located within each cell.

6. The information processor of claim 1 further comprising means for disabling all other cells along the same dimensional axes as a given cell when said theshold is exceeded for said cell.

7. The information processor of claim 2 wherein said predetermined number of cost values represent particular solutions to an assignment problem.

8. The information processor of claim 1 further comprising means for storing said solutions and means for comparing a current solution with a previous stored solution for determining said storing the best solution-to-date.

9. The information processor of claim 8 further comprising a means for interrupting said information processor to transmit the best solution-to-date at any given time.

10. The information processor of claim 6 wherein said predetermined value is said best solution-to-date.

11. The information processor of claim 1 wherein said cost values comprise digital data.

12. An information processor solving assignment problems, said information processor having a multidimensional matrix of processing cells, each capable of receiving, storing and transmitting cost values, comprising:
 said cells being located in a position that represents a particular set of input parameters;
 means for generating a randomly varying signal associated with each cell;
 variable threshold means for generating threshold levels and for permitting said cost value to be transmitted by said cells only when said threshold level is exceeded by said randomly varying signal;
 accumulator means for summing said cost values in a plurality of said cells, after said cost value has been transmitted by said cells;
 comparator means, responsive to said accumulator means, for comparing the sum of said cost values with a predetermined value to classify said sum as being a good or a bad solution; and
 means for adjusting said thresholds, responsive to said comparator means, wherein said thresholds are lowered for those cells which contribute to solutions classified as good and thresholds are raised for cells which contribiute to solutions classified as bad.

13. The information processor of claim 12 further comprising means for determining when the number of cost values transmitted exceeds a predetermined number, wherein said accumulator means sums said predetermined number of said cost values.

14. The information processor of claim 13 wherein said predetermined number of cost values represent particular solutions to an assignment problem.

15. The information processor of claim 13 wherein said assignment problem comprises deghosting from angle-only sensor data; said particular input parameters are particular angles for particular sensors; and predetermined number is the number of targets; and said cost values are proportional to the error associated with intersects from said sensors.

16. The information processor of claim 12 wherein said variable threshold means is located within each cell.

17. The information processor of claim 12 wherein said means for generating a randomly varying signal is located within each cell.

18. The information processor of claim 12 further comprising means for disabling all other cells along the same dimensional axes as a given cell when said theshold is exceeded for said cell.

19. The information processor of claim 12 further comprising means for storing said solutions and means for comparing a current solution with a previous stored solution for determining and storing the best solution-to-date.

20. The information processor of claim 19 further comprising a means for interruping said information processor to transmit the best solution-to-date at any given time.

21. The information processor of claim 19 wherein said predetermined value is said best solution-to-date.

22. The information processor of claim 12 wherein said cost values comprise digital data.

23. A method for solving an assignment problem, said method comprising:
 assigning cells in a multidimensional matrix to locations wherein each cell's location represents a particular input parameter;
 storing cost values in each cell;
 generating a randomly varying signal associated with each said cell;
 transmitting said stored cost values from each cell only when said randomly varying signal exceeds a predetermined threshold;
 summing said transmitted cost values from a plurality of said cells;
 comparing said sum with a predetermined value to classify said sum as being a good or a bad solution; and
 lowering said thresholds for those cells contributing to good solutions and raising said thresholds for those cells contributing to bad solutions each time a set of cost values is summed.

24. The method of claim 23 further comprising the step of disabling all other cells along the same dimensional axes as a given cell when said threshold is exceeded for said cell.

25. The method of claim 23 further comprising the step of determining when the number of costs values transmitted exceeds a predetermined number, wherein said step of summing only occurs after said predetremined number has been exceeded.

26. The method of claim 25 wherein said assignment problem comprises deghosting from angle-only sensor data; said particular input parameters are particular angles for particular sensors; said predetermined number is the number of targets; and said cost values are proportional to the error associated with intersects from said sensors.

27. The method of claim 23 further comprising the steps of:
 storing a previous good solution;
 comparing a current good solution with said stored good solution; and
 storing only the solution that is the better of the two, whereby the best solution-to-date is stored.

28. The method of claim 27 wherein said best solution-to-date is used for said predetermined value.

* * * * *